US010816750B2

United States Patent
Wei

(10) Patent No.: US 10,816,750 B2
(45) Date of Patent: Oct. 27, 2020

(54) LENS MODULE

(71) Applicant: AAC Technologies Pte. Ltd., Singapore (SG)

(72) Inventor: Chuandong Wei, Shenzhen (CN)

(73) Assignee: AAC Optics Solutions Pte. Ltd., Singapore (SG)

(*) Notice: Subject to any disclaimer, the term of this patent is extended or adjusted under 35 U.S.C. 154(b) by 158 days.

(21) Appl. No.: 16/236,510

(22) Filed: Dec. 30, 2018

(65) Prior Publication Data

US 2019/0339476 A1    Nov. 7, 2019

(30) Foreign Application Priority Data

May 7, 2018    (CN) .................... 2018 2 0672225 U

(51) Int. Cl.
*G02B 7/02*    (2006.01)

(52) U.S. Cl.
CPC .................. *G02B 7/022* (2013.01)

(58) Field of Classification Search
CPC .......... G02B 7/02; G02B 7/021; G02B 7/022; G02B 7/023; G02B 7/026

USPC ........................................... 359/808
See application file for complete search history.

(56) References Cited

U.S. PATENT DOCUMENTS

2016/0291285 A1* 10/2016 Park .................... G02B 7/09

* cited by examiner

Primary Examiner — Mohammed A Hasan
(74) Attorney, Agent, or Firm — IPro, PLLC; Na Xu

(57) ABSTRACT

A lens module, including: a lens barrel in which a lens is accommodated, and a holder disposed at periphery of the lens barrel and holding the lens barrel. The lens barrel is provided with a mounting portion, the holder includes an object side surface and a side wall extending from the object side surface and surrounding the periphery of the lens barrel. The side wall is provided with a guiding groove formed by recessing from the side wall, and a locking groove communicating with the guiding groove. The guiding groove extends along axial direction of the holder, and end of the guiding groove communicates with the locking groove. The locking groove extends from the guiding groove along circumferential direction. The mounting portion matches with the guiding groove and slides into the locking groove, the mounting portion rotates along circumferential direction and is received and locked in the locking groove.

10 Claims, 5 Drawing Sheets

LENS MODULE

CROSS-REFERENCE TO RELATED APPLICATIONS

The present application claims priority to Chinese Patent Application No. 201820672225.5, filed on May 7, 2018, the content of which is incorporated herein by reference in its entirety.

TECHNICAL FIELD

The present disclosure relates to the technical field of optical imaging, and in particular, to a lens module.

BACKGROUND

In recent years, with the development of imaging technology and the rise of electronic products with imaging functions, an optical lens module has been widely used in various products, such as cellphones or tablets, and has been continuously improved and optimized. At present, most lens modules are improved in an aspect of how to select a suitable lens with good optical characteristics while making the lens module small and thin, as well as how to combine them to achieve good imaging effects.

The inventor of the present disclosure has found that the lens module has many components, and it is usually necessary to assemble optical components such as lenses into a lens barrel, and then assemble the lens barrel into a motor or a lens holder. However, when the lens barrel is mounted into the motor or into the lens holder from an opening at a side of the motor or the lens holder, the lens barrel is easily dropped out from the motor or the lens holder, which reduces the mounting efficiency of the entire lens module.

DESCRIPTION OF EMBODIMENTS

In order to make the purpose, technical solutions, and advantages of embodiments of the present disclosure to be clearer, the technical solutions in the embodiments of the present disclosure are described in the following with reference to the accompanying drawings in the embodiments of the present disclosure. It is appreciated that, the described embodiments are merely exemplary embodiments of the present disclosure, which shall not be interpreted as limiting the present disclosure. All other embodiments obtained by those skilled in the art without creative efforts according to the embodiments of the present disclosure are within the scope of the present disclosure.

Figure 1:
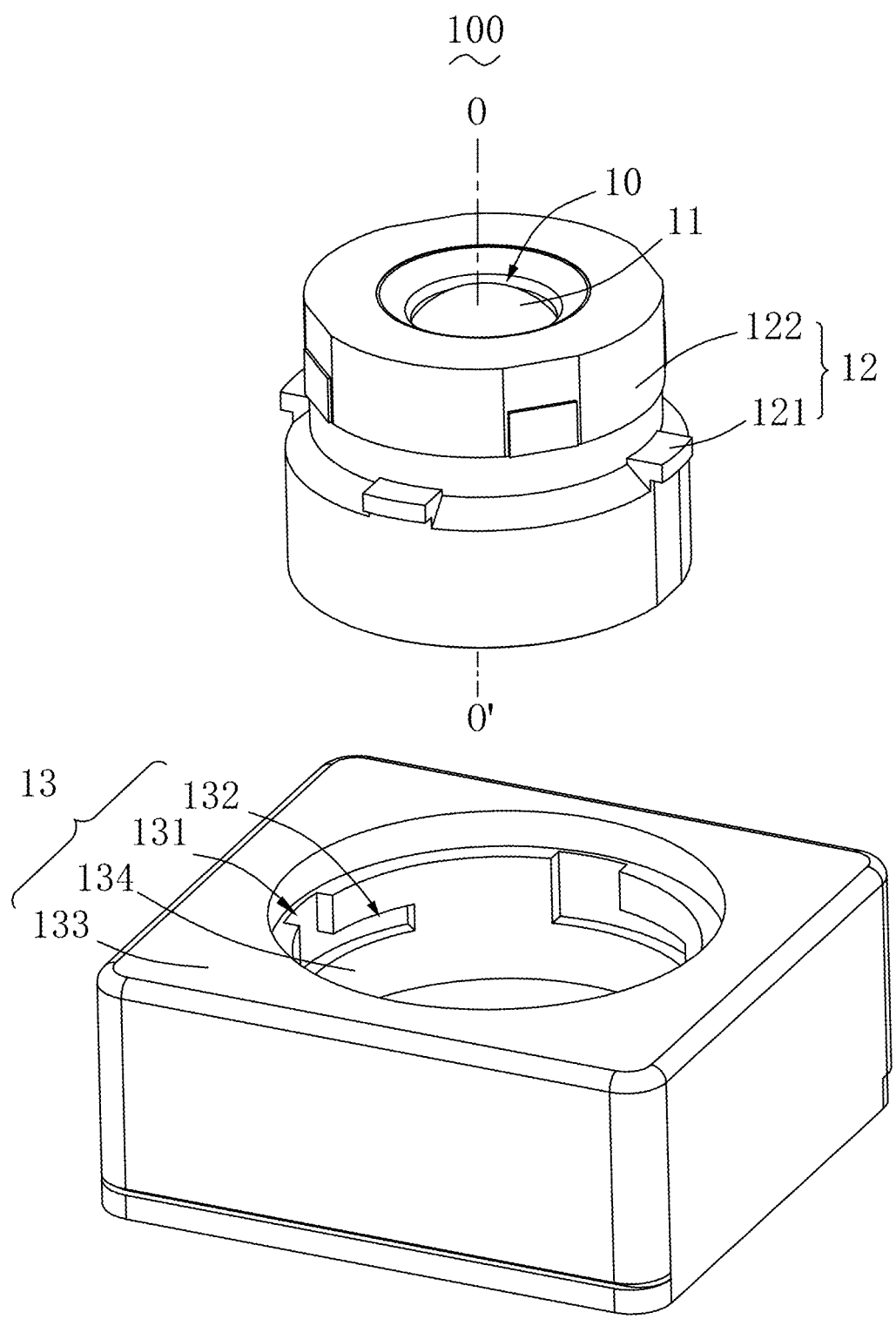
FIG. 1 is a schematic exploded structural view of a lens module in which a holder is a motor according to an embodiment of the present disclosure.
Figure 2:
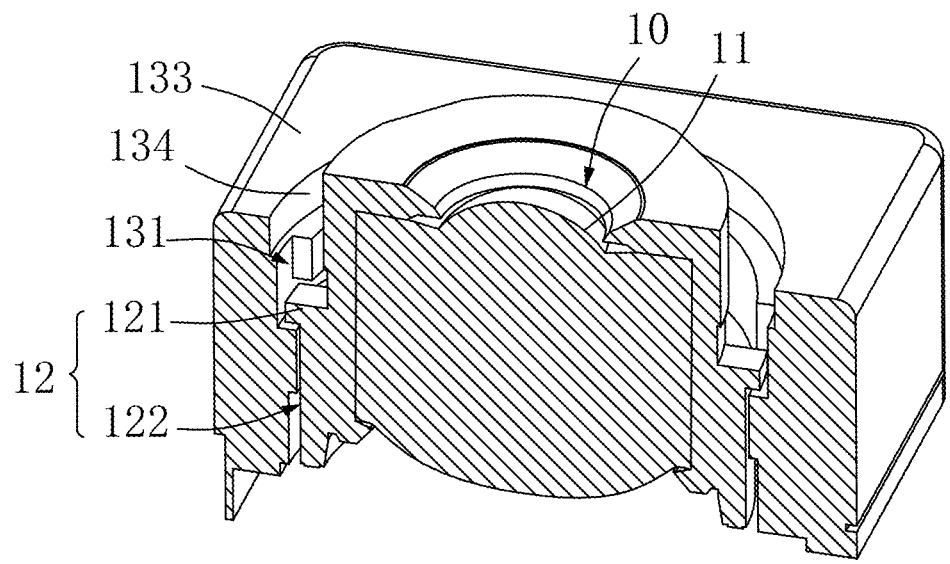
FIG. 2 is a cross-sectional view illustrating a combined structure of the lens module of FIG. 1.

An embodiment of the present disclosure provides a lens module 100. As shown in FIG. 1 and FIG. 2, the lens module 100 includes a lens barrel 12 containing a lens 11, and a holder 13 disposed at a periphery of the lens barrel 12 and holding the lens barrel 12. The lens barrel 12 is provided with a mounting portion 121 that protrudes toward the holder 13. The holder 13 includes an object side surface 133 adjacent to the object side, and a side wall 134 extending from the object side surface 133 toward the image side and surrounding the periphery of the lens barrel 12. On the side wall 134, a guiding groove 131 recessed from the side wall 134 toward the lens barrel 12, and a locking groove 132 communicating with the guiding groove 131 are provided. The guiding groove 131 extends along an axial direction of the holder 13 to an end of the side wall 134 close to the object side, and another end of the guiding groove 131 facing away from the object side communicates with the locking groove 132. The locking groove 132 extends from the guiding groove 131 along a circumferential direction of the holder 13. The mounting portion 121 matches up with the guiding groove 131 and slides into the locking groove 132 under the guiding action of the guiding groove 131. The mounting portion 121 rotates along the circumferential direction of the holder 13 and is received and locked in the locking groove 132.

In this embodiment, the lens barrel 12 is provided with the mounting portion 121 extending toward the holder 13, and the holder 13 is provided with the guiding groove 131 and the locking groove 132. In this way, when the lens barrel 12 is mounted into the holder 13, the lens barrel 12 can be easily mounted from the object side of the holder 13 toward the image side, and the mounting portion 121 is guided by the guiding groove 131, so that the mounting portion 121 can smoothly and quickly reach the locking groove 132. When the mounting portion 121 enters the locking groove 132, the locking groove 132 will lock the mounting portion 121 and thus lock the lens barrel 12 by the mounting portion 121. Moreover, an extending direction of the locking groove 132 is advantageous to more reliably holding the lens barrel 12 in the direction of the lens barrel 12 being mounted into the holder 13 (i.e., the optical axis OO' direction), meanwhile, the mounting portion 121 of the lens barrel 12 is not easy to fall off from the locking groove 132 toward the guiding groove 131, thereby improving the mounting efficiency of the entire lens module 100.

It should be noted that, in this embodiment, since the mounting portion 121 does not move in a direction other than the direction of the groove because of the blocking function of the groove wall of the guiding groove 131, the mounting portion 121 can enter the locking groove 132 more accurately and quickly, which also helps to improve the mounting efficiency of the lens module 100.

Details will be described in the following about this embodiment. The following content is merely for facilitating understanding of the implementation details provided, and may not be necessary in implementing the solution.

In this embodiment, the lens module 100 includes a lens 11, a lens barrel 12, and a holder 13. Herein, the lens barrel 12 is provided therein with a light-passing aperture 10.

The light-passing aperture 10 is used to provide a light path for optical imaging of the lens module 100. The light-passing aperture 10 is enclosed and formed by the lens barrel 12, for details, please refer to FIG. 1, FIG. 3 and FIG. 5.

The lens 11 is used for optical imaging, which is disposed inside the lens barrel 12 and receives light from the light-passing aperture 10. It should be understood that the number of lenses 11 mounted into the lens barrel 12 can be selected according to actual needs, such as 2, or 3, 4, 5, etc., and the material of the lens can be glass or plastic, which will not be limited herein.

The lens barrel 12 encloses the light-passing aperture 10 and an inner receiving space. Herein, the inner receiving space is for accommodating a plurality of optical components related to optical imaging, such as a lens 11, a light shielding film (not shown), a light shielding plate (not shown), a pressure ring (not shown), and the like.

In this embodiment, the lens barrel 12 includes a lens barrel wall 122 and a mounting portion 121. The lens barrel wall 122 extends from the object side toward the image side. The mounting portion 121 is disposed on the lens barrel wall 122, and the mounting portion 121 extends from the lens barrel wall 122 toward the holder 13. When the lens barrel 12 is mounted, the mounting portion 121 matches up with the holder 13, so that the lens barrel 12 if finally mounted and fixed. In this embodiment, the mounting portion 121 is a protrusion, but it should be understood that the "protrusion" is merely an example and does not limit a structure of the mounting portion 121, and the mounting portion 121 may also have other structures.

Figure 3:
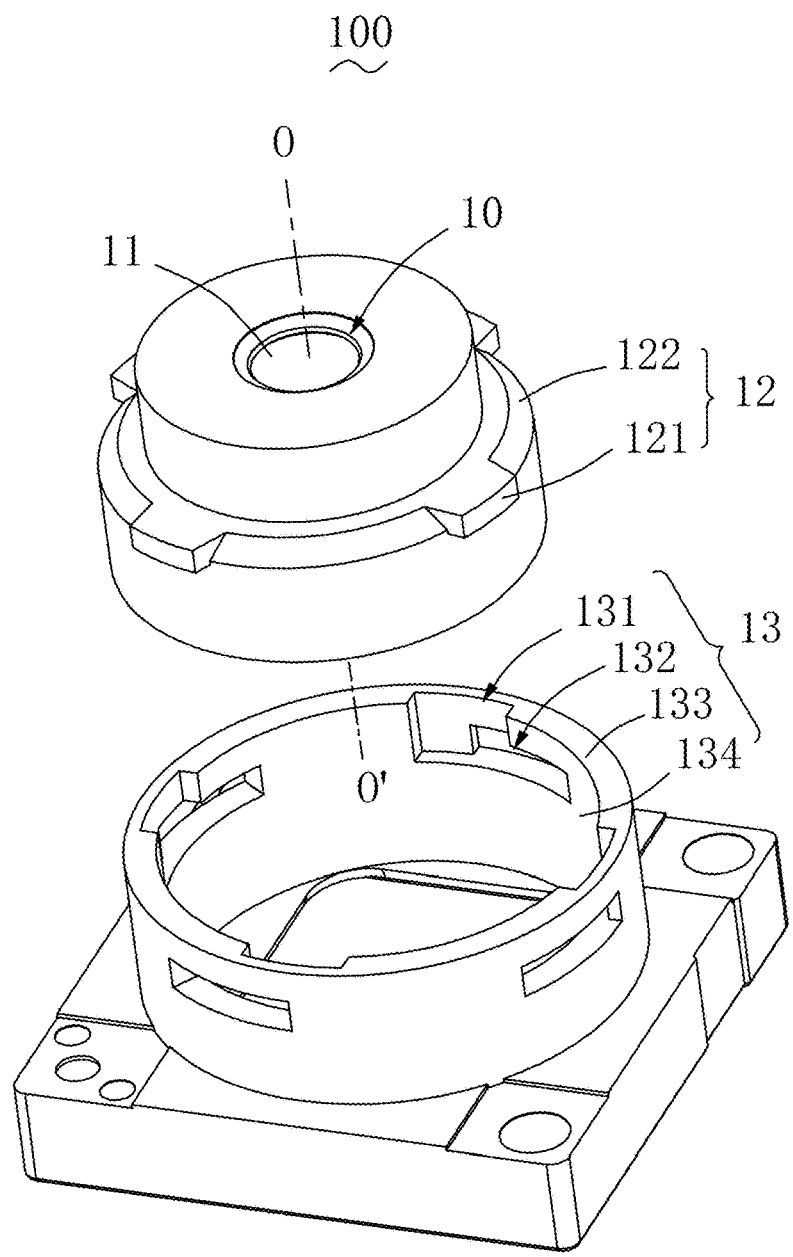
FIG. 3 is a schematic exploded structural view of a lens module in which a holder is a lens holder according to an embodiment of the present disclosure.
Figure 4:
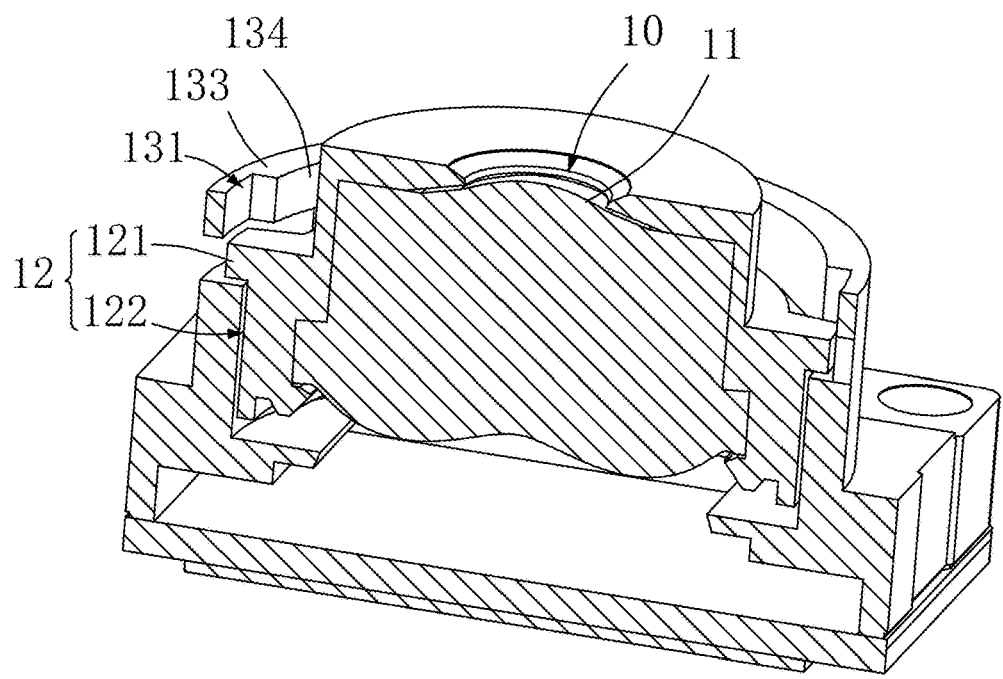
FIG. 4 is a cross-sectional view illustrating a combined structure of the lens module of FIG. 3.
Figure 5:
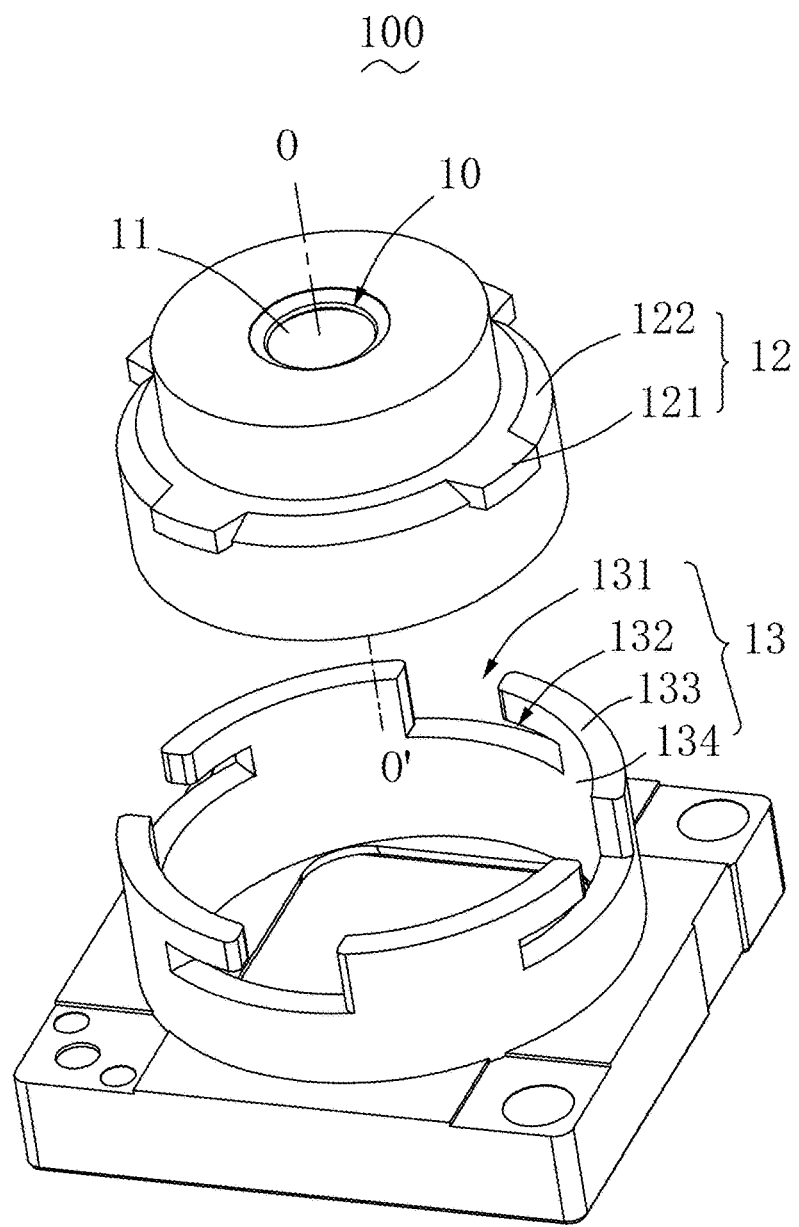
FIG. 5 is a schematic exploded structural view of another lens module in which a holder is a lens holder according to an embodiment of the present disclosure.

The holder 13 is used to fix the lens barrel 12. The holder 13 can have other functions in addition to the fixing function. For example, the holder 13 may specifically be a motor having a vibration function, as shown in FIGS. 1-2. In addition, the holder 13 may also be a lens holder, as shown in FIGS. 3-5. The holder 13 may also be other structures, which will not be enumerate herein.

In this embodiment, the holder 13 is disposed at the periphery of the lens barrel 12, and the interior of the holder 13 forms a cylindrical space to accommodate the lens barrel 12. The periphery of the holder may be a square, a cylinder, or a polygon, which will not be limited herein.

In one embodiment, the holder 13 includes a guiding groove 131, a locking groove 132, an object side surface 133, and a side wall 134. The guiding groove 131 and the locking groove 132 are both disposed on the side wall 134, and the guiding groove 131 communicates with the locking groove 132. The object side surface 133 is adjacent to the object side, and the side wall 134 extends from the object side surface 133 toward the image side and is disposed surrounding the periphery of the lens barrel 12.

The guiding groove 131 extends from the object side surface 133 of the holder 13 toward the image side along the side wall 134. In this way, it is easy to install the lens barrel 12 from the object side into the holder 13.

It should be noted that the groove slot of the guiding groove 131 can extend perpendicularly from the object side toward the image side, that is, the extending direction of the groove slot of the guiding groove 131 is parallel to the extending direction of the optical axis OO' of the lens module 100. In this case, the mounting portion 121 on the lens barrel 12 can slide vertically from the object side into the holder 13 along the groove slot of the guiding groove 131. The groove slot of this guiding groove 131 has a simple structure and a low manufacturing cost. In this embodiment, the groove slot of this guiding groove 131 is in such a structure, as shown in any one of FIGS. 1-5.

It should be understood that the groove slot of the guiding groove 131 may also spirally extend from the object side toward the image side about the optical axis OO', that is, the extending direction of the groove slot of the guiding groove 131 is not parallel to the extending direction of the optical axis OO' of the lens module 100. In this case, the mounting portion 121 on the lens barrel 12 can spirally slide into the holder 13 along the groove slot of the guiding groove 131.

In addition, it should be noted that a depth of the guiding groove 131 in a thickness direction of the side wall 134 may be smaller than a thickness of the side wall 134, that is, the guiding groove 131 does not penetrate through the side wall in the thickness direction of the side wall 134, as shown in FIG. 1 and FIG. 3. In this case, the guiding groove 131 can be applied to the mounting portion 121 having a smaller size without affecting the mechanical strength of the holder 13.

It should be understood that the depth of the guiding groove 131 in the thickness direction of the side wall 134 may also be equal to the thickness of the side wall 134, that is, the guiding groove 131 penetrates through the side wall 134 in the thickness direction of the side wall 134, as shown in FIG. 5. In this case, the guiding groove 131 can be applied to the mounting portion 121 having a larger size.

It should be noted that the depth of the guiding groove 131 in the thickness direction of the sidewall 134 may also satisfy the size and other structure of the mounting portion 121, which will not be further described herein.

Optionally, in this embodiment, a dimension of the guiding groove 131 in the circumferential direction corresponds to a dimension of the mounting portion 121 in the circumferential direction. Thus, when the mounting portion 121 is mounted into the guiding groove 131, it is not difficult for the mounting portion 121 to slide in the guiding groove 131, which may be caused by the small dimension of the guiding groove 131 in the circumferential direction.

In addition, optionally, in this embodiment, the dimension of the guiding groove 131 in the axial direction is at least twice the dimension of the mounting portion 121 in the axial direction. Thus, with respect to the mounting portion 121, the guiding groove 131 has a deeper depth in the axial direction of the holder 13, which is advantageous in preventing the mounting portion 121 from directly dropping out from the guiding groove 131 due to insufficient depth of the guiding groove 131 during assembling of the lens barrel 12 and the holder 13.

The locking groove 132 extends from the end of the guiding groove 131 near the image side toward the circumferential direction of the lens barrel 12, that is, the locking groove 132 extends toward the rotation direction of the lens barrel 12, in other words, the locking groove 132 extends from the guiding groove 13 toward a direction perpendicular to the optical axis OO'. In this way, it is advantageous for the locking groove 132 to hold the lens barrel 12 more firmly in the gravity direction, and at the same time, the mounting portion 121 of the lens barrel 12 is not easily dropped out from the locking groove 132 toward the guiding groove 31. In addition, this locking groove 132 has a simple structure and a low manufacturing cost.

It should be understood that the groove slot of the locking groove 132 may also extend from the guiding groove 131 toward the optical axis OO'. The groove slot of the locking groove 132 may extend obliquely toward the object side, or may extend obliquely toward the image side, so as to meet different structure requirements.

In addition, it should be noted that the depth of the locking groove 132 in the thickness direction of the side wall 134 may be smaller than the thickness of the side wall 134, that is, the locking groove 132 does not penetrate through the side wall 134 in the thickness direction of the side wall 134. In this case, the locking groove 132 can be applied to the mounting portion 121 having a smaller size without affecting the mechanical strength of the holder 13.

It should be understood that the depth of the locking groove 132 in the thickness direction of the side wall 134 may also be equal to the thickness of the side wall 134, that is, the locking groove 132 penetrates through the side wall 134 in the thickness direction of the side wall 134. In this case, the locking groove 132 can be applied to the mounting portion 121 having a larger size.

It should be noted that the depth of the locking groove 132 in the thickness direction of the sidewall 134 may also satisfy the size and other structures of the mounting portion 121, which will not be further described herein.

Optionally, in this embodiment, the dimension of the locking groove 132 in the axial direction corresponds to the dimension of the mounting portion 121 in the axial direction. Thus, when the mounting portion 121 is mounted into the locking groove 132, it is not difficult for the mounting portion 121 to slide in the locking groove 132, which may be caused by the small dimension of the locking groove 132 in the axial direction; and it is not easy for the mounting portion 121 to drop out from the locking groove 132, which may be caused by the large dimension of the locking groove 132 in the axial direction.

In this embodiment, the guiding groove 131 and the locking groove 132 communicating with the guiding groove 131 together form a mounting groove that matches up with the mounting portion 121. In this embodiment, the mounting groove is specifically an L-shaped spiral groove, that is, each guiding groove 131 and each locking groove 132 communicating with the guiding groove 131 form an L-shaped spiral groove, and each L-shaped spiral groove has a same structure. The number of the mounting groove/L-shaped spiral groove may be one, two, three, four, five, etc. In this embodiment, the number of the mounting groove/L-shaped spiral groove is four, and two of the four the mounting grooves/L-shaped spiral grooves are opposite to each other while the other two of the four the mounting grooves/L-shaped spiral grooves are opposite to each other, so that the locking force of the mounting grooves/L-shaped spiral grooves on the lens barrel 12 are more even, which helps the lens barrel 12 to be more firmly held on the holder 13.

In this embodiment, the mounting portion 121 on the lens barrel 12 can enter the guiding groove 131 having a L-shaped spiral groove from the notch of the L-shaped spiral groove, and then the mounting portion 121 is locked in the locking groove 132 of the L-shaped spiral groove by spiral the lens barrel/holder and then is fixed by glue. It should be noted that the matching up of the L-shaped spiral groove with the mounting portion 121 in this embodiment not only effectively prevents the lens barrel 12 from dropping, but also improves the reliability of the lens module 100 after the lens barrel 12 is assembled and glued.

It should be understood by those skilled in the art that the above embodiments are merely exemplary embodiments of the present disclosure, and in practical applications, various changes may be made without departing from the spirit and scope of the present disclosure.

What is claimed is:

1. A lens module, comprising:
   a lens barrel, in which a lens is accommodated; and
   a holder disposed at a periphery of the lens barrel and holding the lens barrel,
   wherein the lens barrel is provided with an installation portion protruding towards the holder, the holder comprises an object side surface close to an object side and a side wall extending from the object side surface towards an image side and surrounding the periphery of the lens barrel, the side wall is provided with a guiding groove recessed from the side wall towards a direction facing away from the lens barrel and a locking groove communicating with the guiding groove; the guiding groove extends along an axial direction of the holder to an end of the side wall close to the object side, and an end of the guiding groove facing away from the object side communicates with the locking groove; the locking groove extends from the guiding groove along a circumferential direction of the holder; the installation portion matches up with the guiding groove and slides into the locking groove through the guiding groove, and the installation portion rotates along the circumferential direction of the holder and is accommodated and locked in the locking groove.

2. The lens module according to claim 1, wherein the guiding groove penetrates through the side wall in a thickness direction of the side wall.

3. The lens module according to claim 1, wherein a depth of the guiding groove in a thickness direction of the side wall is smaller than a thickness of the side wall.

4. The lens module according to claim 1, wherein the locking groove penetrates through the side wall in a thickness direction of the side wall.

5. The lens module according to claim 1, wherein a depth of the locking groove in a thickness direction of the side wall is smaller than a thickness of the side wall.

6. The lens module according to claim 1, wherein the guiding groove and the locking groove communicating with the guiding groove form an installation groove that matches up with the installation portion; four installation grooves are provided, and two of the four installation grooves are opposite to each other, and the other two of the four installation grooves are opposite to each other.

7. The lens module according to claim 1, wherein the holder is a motor or a lens holder.

8. The lens module according to claim 1, wherein the installation portion is a protrusion.

9. The lens module according to claim 1, wherein a circumferential dimension of the guiding groove corresponds to a circumferential dimension of the installation portion, and an axial dimension of the locking groove corresponds to an axial dimension of the installation portion.

10. The lens module according to claim 1, wherein an axial dimension of the guiding groove is at least twice an axial dimension of the installation portion.

* * * * *